(12) United States Patent
Matsuzaki et al.

(10) Patent No.: US 12,565,278 B2
(45) Date of Patent: Mar. 3, 2026

(54) BALANCE BIKE

(71) Applicant: KAWASAKI MOTORS, LTD., Akashi (JP)

(72) Inventors: Shota Matsuzaki, Akashi (JP); Masato Kogirima, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 729 days.

(21) Appl. No.: 17/896,393

(22) Filed: Aug. 26, 2022

(65) Prior Publication Data

US 2023/0068636 A1 Mar. 2, 2023

(30) Foreign Application Priority Data

Aug. 26, 2021 (JP) ................................. 2021-138115

(51) Int. Cl.
B62K 3/10 (2006.01)
B62J 1/06 (2006.01)
B62J 25/04 (2020.01)

(52) U.S. Cl.
CPC .................. B62K 3/10 (2013.01); B62J 1/06 (2013.01); B62J 25/04 (2020.02)

(58) Field of Classification Search
CPC . B62K 3/10; B62K 9/00; B62K 19/10; B62K 19/06; B62K 19/32; B62K 19/36;
(Continued)

(56) References Cited

U.S. PATENT DOCUMENTS 3,794,353 A * 2/1974 Oliver ...................... B62J 25/06
74/564
5,211,415 A * 5/1993 Gasiorowski .......... B62K 19/10
280/281.1
(Continued)

FOREIGN PATENT DOCUMENTS

CN 208021621 U 10/2018
EP 2481660 B1 2/2016
(Continued)

OTHER PUBLICATIONS

Kyaw 16 (Global), Japan and Dirtbikeplus, Dirt bike plus, <URL; https://www.dirtbikeplus.jp/products/detail/ 30009?srsltid= AfmBOopP2_KKfgDjQzoKHNhvw8Q281N4wK047EVo_-QrbcMqRJ7wNvob>, in 5 pages. JP Office Action submitted as concise explanation.
(Continued)

*Primary Examiner* — Anne Marie M Boehler
(74) *Attorney, Agent, or Firm* — PROCOPIO, CORY, HARGREAVES & SAVITCH LLP

(57) ABSTRACT

There is provided a balance bike including: a front wheel and a rear wheel; a head portion steerably holding the front wheel; a main frame including a front frame extending rearward from the head portion while being inclined downward and a rear frame extending rearward from a rear end of the front frame at an angle closer to a horizontal direction than a direction in which the front frame extends, the main frame connecting the head portion and the rear wheel; and a seat support portion fixed to a bent portion where the front frame and the rear frame are connected to each other, and supporting a seat slidably in an up-down direction.

10 Claims, 11 Drawing Sheets

(58) Field of Classification Search

CPC ....... B62K 2204/00; B62J 25/06; B62J 25/04; B62J 1/06

USPC ............ 280/291, 7.17, 87.021, 87.05, 281.1; 180/220

See application file for complete search history.

(56) References Cited

U.S. PATENT DOCUMENTS

| | | | |
|---|---|---|---|
| 9,731,785 B1 | 8/2017 | Liu | |
| 2002/0121754 A1* | 9/2002 | Nall, III | B62K 3/002 |
| | | | 280/87.021 |
| 2006/0103108 A1* | 5/2006 | Hunwardsen | B62J 25/06 |
| | | | 280/291 |
| 2007/0238585 A1 | 10/2007 | Mondello et al. | |
| 2010/0052287 A1 | 3/2010 | McFarland | |
| 2010/0320721 A1* | 12/2010 | Chung | B62K 3/04 |
| | | | 280/281.1 |
| 2015/0130150 A1 | 5/2015 | O'Connell | |
| 2015/0336627 A1* | 11/2015 | Kump | B62K 19/02 |
| | | | 280/281.1 |
| 2016/0001843 A1* | 1/2016 | Evans | B62M 1/36 |
| | | | 280/7.17 |
| 2018/0339744 A1 | 11/2018 | McFarland | |
| 2020/0148302 A1* | 5/2020 | Gatto | B62K 13/00 |
| 2020/0385080 A1* | 12/2020 | Chen | F28F 13/06 |
| 2021/0371033 A1* | 12/2021 | Huang | B62J 25/04 |
| 2022/0274662 A1* | 9/2022 | Radenbaugh | B62M 6/40 |
| 2023/0062620 A1* | 3/2023 | Matsuzaki | B62M 6/90 |
| 2024/0425137 A1* | 12/2024 | Kogirima | B62K 11/10 |

FOREIGN PATENT DOCUMENTS

| | | | |
|---|---|---|---|
| JP | UM-S53-159060 A | 9/1982 | |
| JP | 2006-001443 A | 1/2006 | |
| JP | 2018-027728 A | 2/2018 | |
| JP | 2018-034696 A | 3/2018 | |
| JP | 2020-520853 T | 7/2020 | |
| JP | UM-3232835 U | 7/2021 | |
| WO | 2013-157771 A1 | 10/2013 | |

OTHER PUBLICATIONS

A Daytona Corporation of 2018 motor cycle show presentation ; New Incams ; Japan, Motor—Fan.jp,Mar. 2018 months, < URL: https://car.motor -fan.jp/event/motorcycleshow2018/detail/ 10003282 >, in * pages. JP Office Action submitted as concise explanation.

Japanese Patent Office, Office Action, Application No. 2021-138115, dated Jan. 7, 2025, in 15 pages.

* cited by examiner

BALANCE BIKE

CROSS-REFERENCE TO RELATED APPLICATIONS

This application is based on and claims priority under 35 USC 119 from Japanese Patent Application No. 2021-138115 filed on Aug. 26, 2021, the contents of which are incorporated herein by reference.

TECHNICAL FIELD

The present disclosure relates to a balance bike.

BACKGROUND ART

A balance bike (kids' bike) disclosed in US2015/0130150A1 is known. The balance bike is a type of bicycle for children. In the balance bike, a crank that supports a pedal is omitted so that the bike can travel while kicking the ground. Further, as one type of balance bike, there is an electric balance bike equipped with a motor and a battery.

It is desirable that a balance bike is adapted to a wide range of users having different physical sizes due to its nature.

SUMMARY OF INVENTION

The present disclosure provides a balance bike capable of expanding a range of users who can ride the bike.

According to an illustrative aspect of the present disclosure, a balance bike includes: a front wheel and a rear wheel; a head portion steerably holding the front wheel; a main frame including a front frame extending rearward from the head portion while being inclined downward and a rear frame extending rearward from a rear end of the front frame at an angle closer to a horizontal direction than a direction in which the front frame extends, the main frame connecting the head portion and the rear wheel; and a seat support portion fixed to a bent portion where the front frame and the rear frame are connected to each other, and supporting a seat slidably in an up-down direction.

According to another illustrative aspect of the present disclosure, a balance bike includes: a front wheel and a rear wheel; a head portion steerably holds the front wheel; a main frame extending rearward from the head portion while being inclined downward, main frame connecting the head portion and the rear wheel; and a pair of left and right steps on which feet of an occupant are placed, the steps being supported by left and right support portions provided in the main frame. The steps are displaceable between a protruded state in which the steps protrude outward in a vehicle width direction from the main frame and a stored state in which an amount of protrusion in the vehicle width direction is smaller than an amount of protrusion in the protruded state.

According to the balance bike of the present disclosure, it is possible to exp and a range of users who can ride the bike.

DESCRIPTION OF EMBODIMENTS

(1) First Embodiment

Hereinafter, a first embodiment of the present disclosure will be described with reference to the drawings.

[Entire Configuration of Balance Bike]

Figure 1:
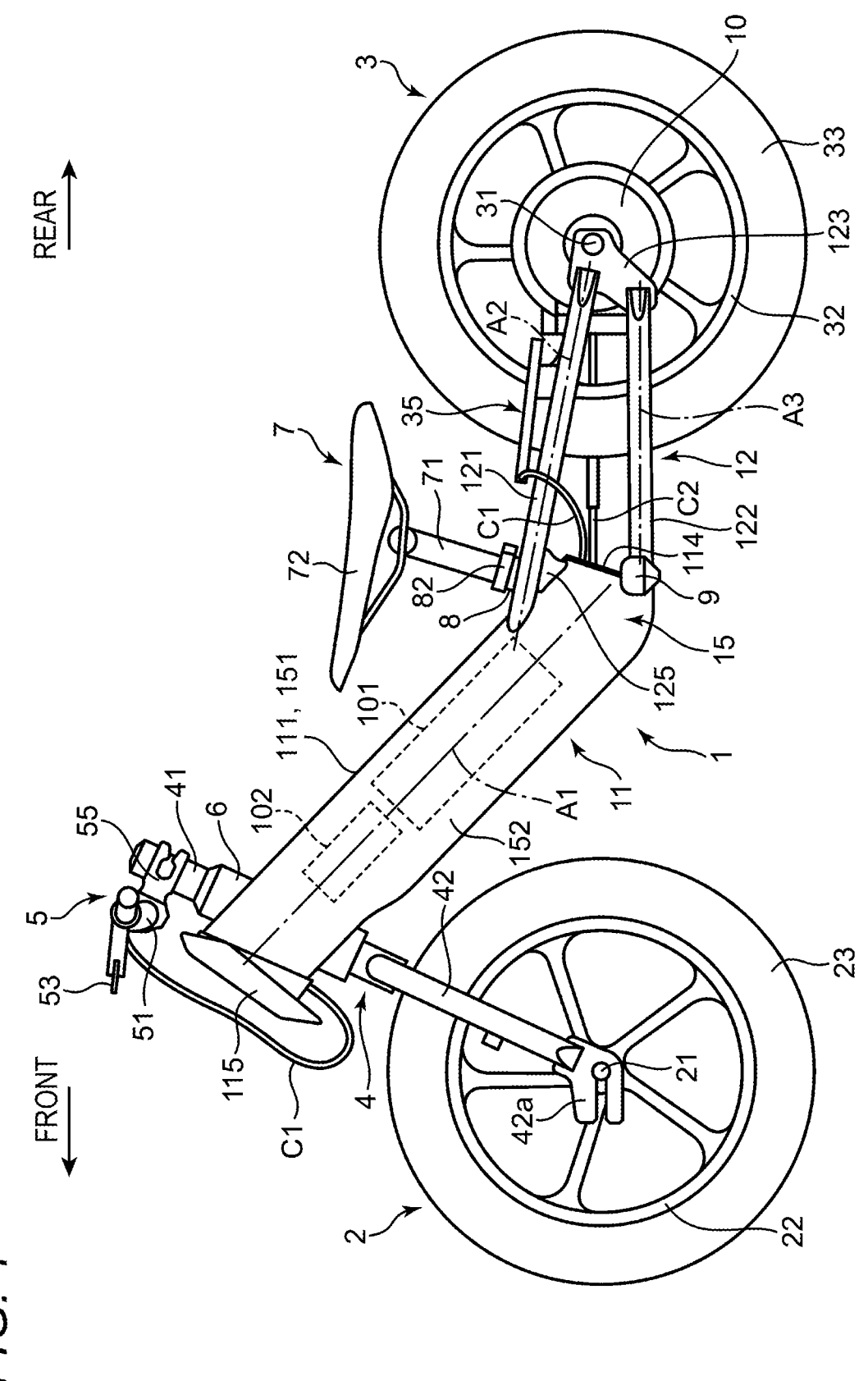
FIG. 1 is a side view of a balance bike according to a first embodiment of the present disclosure.
Figure 2:
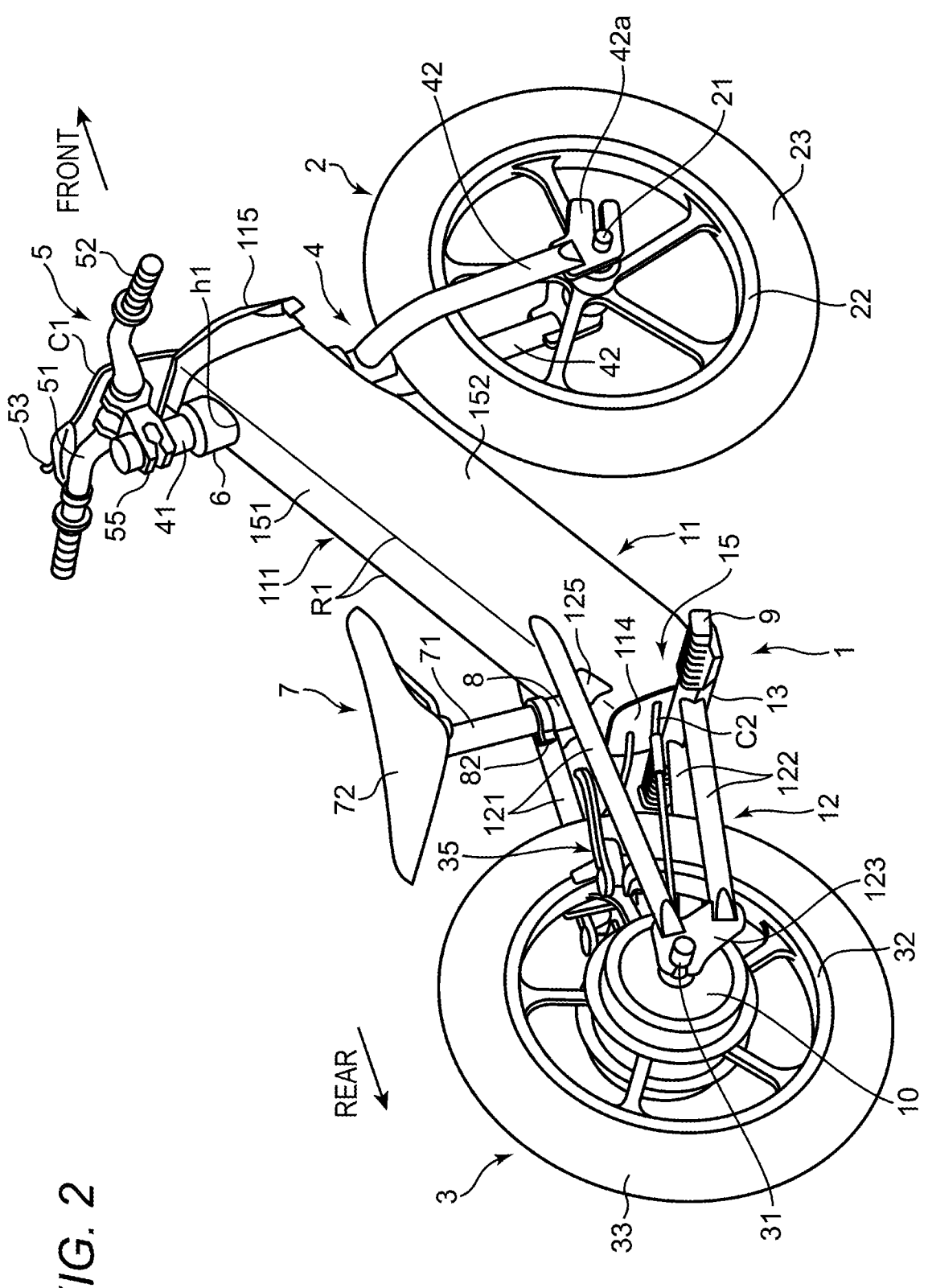
FIG. 2 is a perspective view of the balance bike as viewed obliquely rearward on an upper side.
Figure 3:
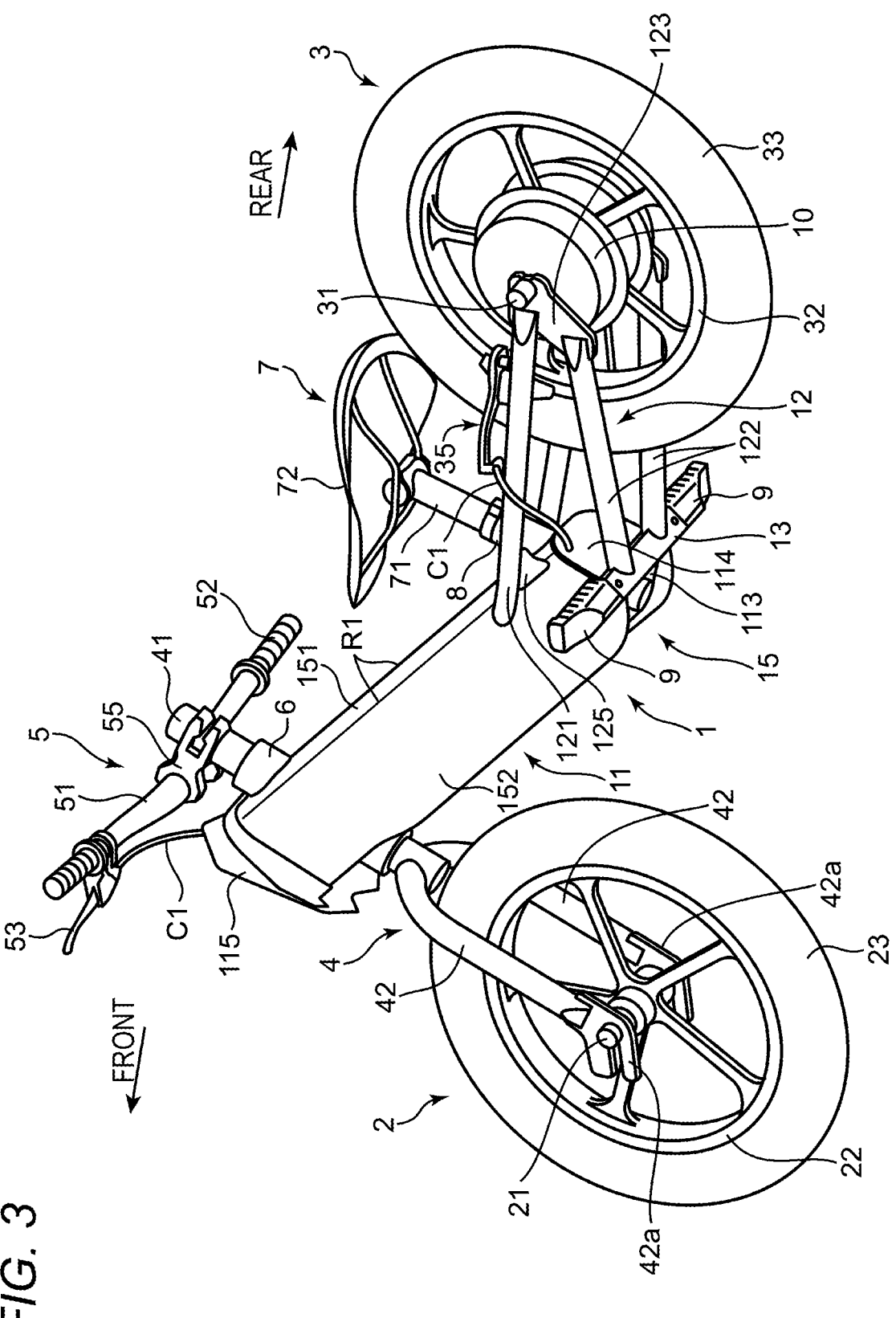
FIG. 3 is a perspective view of the balance bike as viewed obliquely rearward on a lower side.
Figure 4:
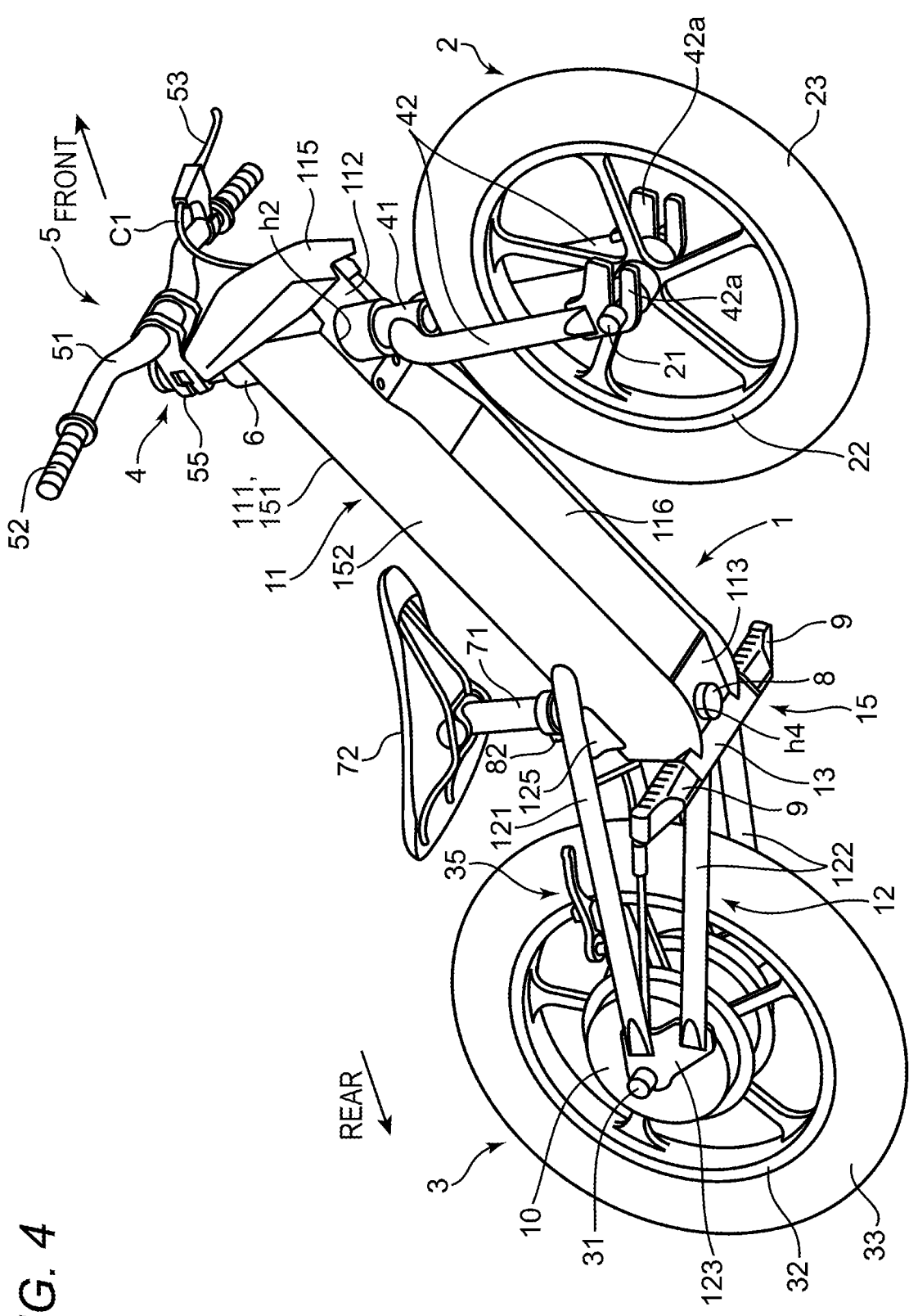
FIG. 4 is a perspective view of the balance bike as viewed obliquely from a lower front side.

FIG. 1 is a side view of a balance bike according to a first embodiment of the present disclosure. FIGS. 2 to 4 are perspective views of the balance bike. The balance bike shown in FIGS. 1 to 4 is a kids' bike mainly for children. Unlike a bicycle that travels by pedaling (rotating) a pedal with a foot, the balance bike omits a crank that supports the pedal. The balance bike may be used in practice before riding on the bicycle, that is, in practice for developing a sense of balance and getting a point of weight transfer from left to right. A user who rides on the balance bike, that is, an occupant, kicks the ground rearward in a posture of sitting on a seat (saddle). Accordingly, a reaction force from the ground acts on the balance bike as a forward propulsive force, and the balance bike travels forward.

The balance bike includes a main frame 1, a front wheel 2, a rear wheel 3, a front fork 4, a handle 5, a head tube 6, a seat 7, a seat tube 8, a pair of left and right steps 9, and a motor 10. That is, the balance bike accordingly the present embodiment is capable of self-traveling by the kick of the occupant described above and electric traveling by the motor 10. The head tube 6 corresponds to a "head portion" in the present disclosure. The seat tube 8 corresponds to a "seat support portion" in the present disclosure.

The main frame 1 is a frame constituting a main part of a body of the balance bike, and includes a front frame 11, a rear frame 12, and a connecting member 13 (see FIGS. 2 to 4) interposed between the frames 11 and 12. The front frame 11 extends rearward from the head tube 6 while being inclined downward. The rear frame 12 extends rearward from a rear end of the front frame 11 at an angle closer to a horizontal direction than the front frame 11. The front frame 11 and the rear frame 12 (specifically, lower pipes 122 to be described later) are joined to each other by welding via the connecting member 13. That is, the main frame 1 has a shape bent so as to form a shallow V-shape in a side view.

The main frame 1 is bent so as to protrude downward at a portion where the front frame 11 and the rear frame 12 are connected to each other. In other words, the main frame 1 is bent such that an intermediate portion thereof in a front-rear direction is located below an imaginary straight line connecting the head tube 6 and a center of the rear wheel 3 (an axle 31 to be described later) in the side view. Hereinafter, a portion where the main frame 1 is bent, that is, a portion where the front frame 11 and the rear frame 12 are connected to each other is referred to as a bent portion 15. A more detailed structure of the main frame 1 will be described later.

The front wheel 2 includes an axle 21, a wheel body 22, and a tire 23. The axle 21 is a shaft that functions as a rotation center of the front wheel 2, and is fixed to a lower end portion of the front fork 4 (specifically, a leg portion 42 to be described later). The wheel body 22 is a rigid component rotatable about the axle 21, and is attached to the axle 21 via a bearing. The tire 23 is a ring-shaped rubber component attached to an outer peripheral portion (rim) of the wheel body 22.

The front fork 4 is a member that connects the handle 5 and the front wheel 2, and includes a stem portion 41 and a pair of left and right leg portions 42. The stem portion 41 is a pipe member extending from the handle 5 toward the front wheel 2, and extends in an up-down direction in an inclined posture such that an upper end portion thereof is located rearward of a lower end portion thereof. An intermediate portion of the stem portion 41 is coaxially inserted into the head tube 6. The pair of leg portions 42 extend downward while branching left and right from the lower end portion of the stem portion 41. A lower end portion of each leg portion 42 is a fixing portion 42a to which both end portions of the axle 21 of the front wheel 2 are fixed via a fastening member or the like. In other words, the front wheel 2 is detachably attached to the front fork 4 by fastening the axle 21 to the fixing portion 42a of the leg portion 42.

The handle 5 includes a handlebar 51, an accelerator grip 52, and a brake lever 53. The handlebar 51 is a bar member that is provided to steer the front wheel 2 and extends in a left-right direction (vehicle width direction), and is fixed to the upper end portion of the stem portion 41 of the front fork 4 via a bracket 55. When the handlebar 51 is steered in the front-rear direction, the front fork 4 rotates about its axis to change a direction of the front wheel 2, thereby changing a traveling direction of the balance bike. The accelerator grip 52 is a grip that the occupant performs a twisting operation when the balance bike is electrically traveling, and is attached so as to cover a right side portion of the handlebar 51. The accelerator grip 52 is attached to the right side portion of the handlebar 51 so as to be rotatable about its axis extending in the left-right direction so as to allow the twisting operation. The brake lever 53 is a lever to be gripped by the occupant when decelerating the balance bike, and is attached to a left side portion of the handlebar 51.

The head tube 6 is a cylindrical member capable of receiving the stem portion 41 of the front fork 4, and is fixed to a front end portion of the front frame 11. Specifically, the head tube 6 is fixed to the front frame 11 in a state of penetrating the front end portion of the front frame 11 in the up-down direction. The head tube 6 holds the stem portion 41 while allowing the stem portion 41 to rotate about its axis. In other words, the head tube 6 steerably holds the front wheel 2 via the front fork 4.

The seat 7 includes a seat post 71 and a saddle 72. The seat post 71 is a pipe member that extends in the up-down direction in an inclined posture such that an upper end portion thereof is located rearward of a lower end portion thereof. At least a lower portion of the seat post 71 is coaxially inserted into the seat tube 8. The saddle 72 is a component that supports buttocks of the occupant riding in the balance bike, and is detachably fixed to the upper end portion of the seat post 71.

The seat post 71 supports an intermediate portion of the saddle 72 in the front-rear direction. In other words, a front portion of the saddle 72 extends forward relative to the seat post 71, and a rear portion of the saddle 72 extends rearward relative to the seat post 71. A rear end portion of the saddle 72 is located rearward of a rear end portion of the front frame 11.

The seat tube 8 is a cylindrical member capable of receiving the seat post 71, and is fixed to the rear end portion of the front frame 11. Specifically, the seat tube 8 is fixed to the front frame 11 in a state of penetrating the rear end portion of the front frame 11 in the up-down direction. As described above, the rear end portion of the front frame 11 is a portion that is non-parallel to a front end portion of the rear frame 12, and forms the bent portion 15 of the main frame 1 in combination with the front end portion of the rear frame 12. In other words, the seat tube 8 is fixed to the bent portion 15 of the main frame 1. The seat tube 8 may be formed to have the same external dimensions (diameter and height) as those of the head tube 6. Accordingly, a dimension of the front frame 11 in the vehicle width direction can be uniformly set from the front end to the rear end.

The seat tube 8 holds the seat post 71 slidably in an axial direction (up-down direction) so that a height of the seat 7 is variable. The height of an upper end of the seat tube 8 is lower than an upper end of the rear wheel 3 (a height L1 in FIG. 5 described later). A clamp 82 is attached to the upper end of the seat tube 8. The clamp 82 is a lock device for locking the seat 7 at a desired height, and can be switched between a released state and a locked state. That is, the clamp 82 allows the seat post 71 to slide in the released state, and clamps the seat post 71 to prohibit the seat post 71 from sliding in the locked state. By using such a clamp 82, the occupant can adjust the height of the saddle 72 of the seat 7 to the desired height.

Figure 5:
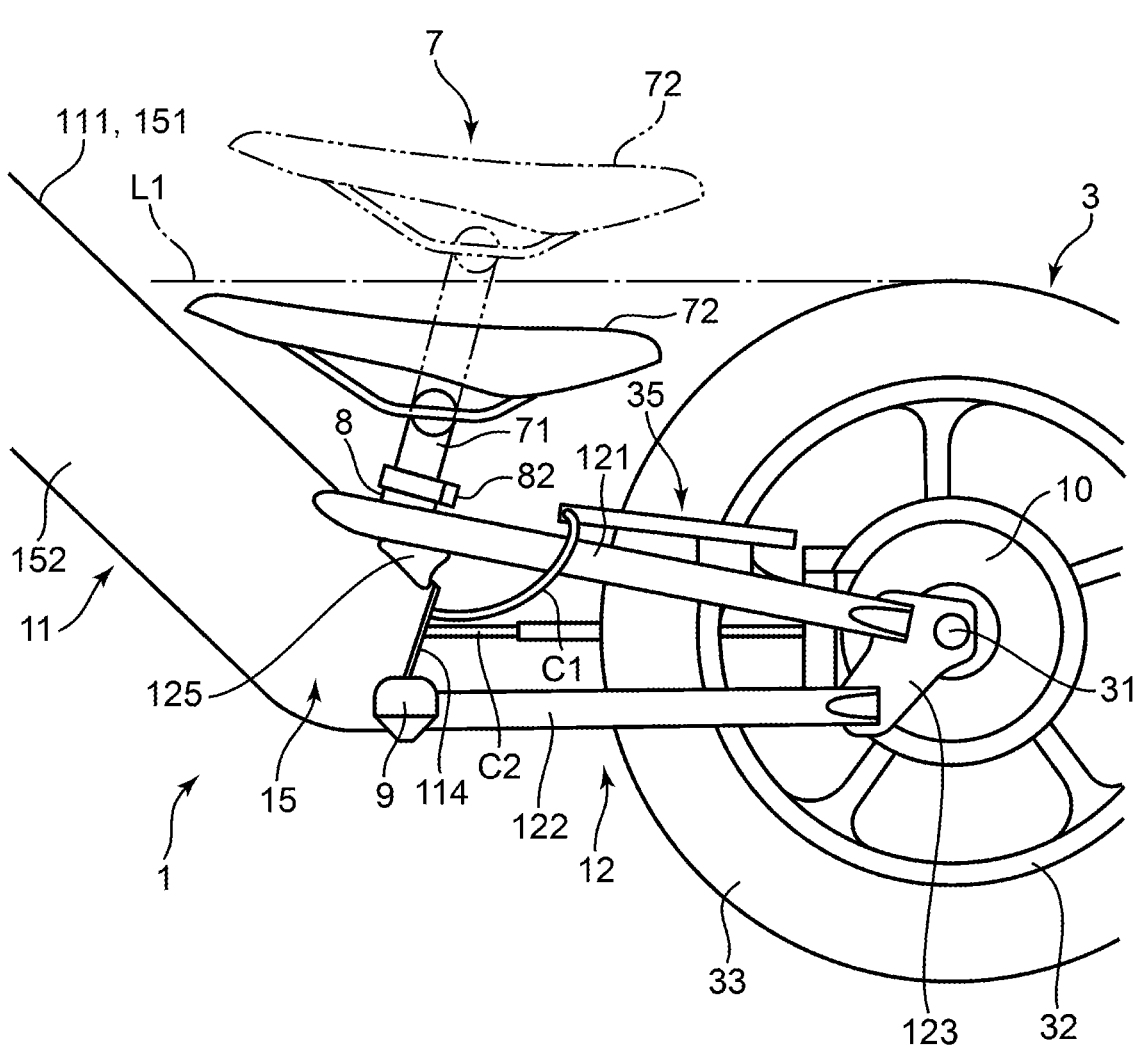
FIG. 5 is a side view showing a height adjustment range of a seat.

FIG. 5 is a diagram showing a height adjustment range of the seat 7. In FIG. 5, the seat 7 at a lower limit height is indicated by a solid line, and the sheet 7 at an upper limit height is indicated by a two-dot chain line. Here, the lower limit height of the seat 7 is the height of an upper surface of the saddle 72 when the seat post 71 is slid downward to a maximum extent. The upper limit height of the seat 7 is the height of the upper surface of the saddle 72 when the seat post 71 is slid upward to the maximum extent. As shown in FIG. 5, when the seat 7 is lowered to the lower limit height (solid line), the upper surface of the saddle 72 is lower than the height L1 corresponding to the upper end of the rear wheel 3. When the seat 7 is raised to the upper limit height (two-dot chain line), the upper surface of the saddle 72 is higher than the height L1 corresponding to the upper end of the rear wheel 3. In other words, the height of the saddle 72 of the seat 7 can be adjusted within a range from a level higher than the upper end of the rear wheel 3 to a level lower than the upper end of the rear wheel 3.

The rear wheel 3 includes the axle 31, a wheel body 32, and a tire 33. The axle 31 is a shaft that functions as a rotation center of the rear wheel 3, and is fixed to a rear end portion (an end plate 123 to be described later) of the rear frame 12. The wheel body 32 is a rigid component rotatable about the axle 31, and is attached to the axle 31 via the motor 10. The tire 33 is a ring-shaped rubber component attached to an outer peripheral portion (rim) of the wheel body 32.

The motor 10 is an electric motor that is driven by being supplied with electric power. The motor 10 is a so-called in-wheel motor, and is coaxially attached to a central portion (hub) of the wheel body 32 so as to directly rotate the rear wheel 3. Although not shown in detail, the motor 10 includes a stator that is not rotatable with respect to the axle 31 and a rotor that rotates with respect to the stator when energized.

The rotation of the rotor is transmitted to the wheel body 32 via an output shaft coaxial with the wheel body 32, whereby the rear wheel 3 is rotationally driven. By using the in-wheel motor as the motor 10, simplification and weight reduction of a drive system are achieved.

Figure 6:
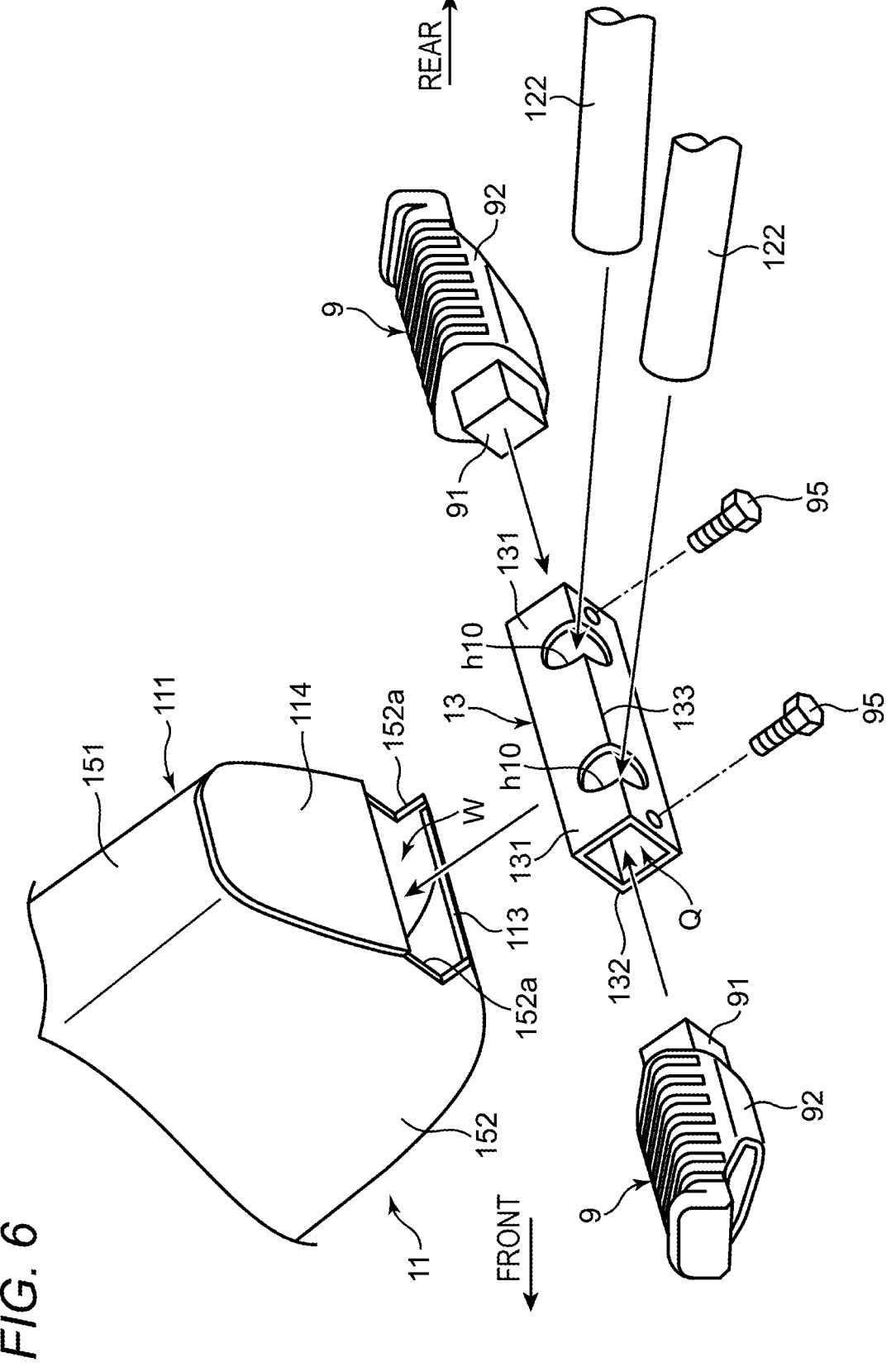
FIG. 6 is an exploded perspective view showing an intermediate portion of a main frame in an exploded state.

FIG. 6 is an exploded perspective view showing an intermediate portion of the main frame 1 in an exploded state. As shown in FIG. 6, each of the pair of steps 9 includes a base portion 91 and a step body 92. The base portion 91 is an attachment portion to the main frame 1, and is fixed in an inserted state to an end portion of the connecting member 13 in the main frame 1 (a support portion 131 to be described later) in the vehicle width direction. The step body 92 is a component on which the feet of the occupant are placed, and is provided so as to protrude outward in the vehicle width direction from the base portion 91 inserted into the connecting member 13.

A brake 35 that applies a braking force to the rear wheel 3 is attached to the rear frame 12. The brake 35 is mechanically connected to the brake lever 53 via a cable C1 routed so as to pass through the inside of the front frame 11. When the occupant performs an operation of gripping the brake lever 53, an operation force to the brake lever 53 is transmitted to the brake 35 via the cable C1. Accordingly, braking force for restricting the rotation of the rear wheel 3 is applied from the brake 35 to the wheel body 32.

As shown in FIG. 1, a battery 101 and a controller 102 are stored in the front frame 11. The battery 101 is a power storage device that stores the electric power to be supplied to the motor 10. The controller 102 is a control device that controls the rotation of the motor 10. The controller 102 is electrically connected to the motor 10 via a cable C2 routed so as to pass through the inside of the front frame 11, and is electrically connected to the accelerator grip 52 via another cable. When the occupant performs an operation of twisting the accelerator grip 52, a signal indicating an operation amount or the like of the twisting operation is input to the controller 102. The controller 102 controls power supply from the battery 101 to the motor 10 so that the motor 10 is rotationally driven at a desired rotation speed based on the input operation signal.

[Detailed Structure of Main Frame]

Next, a more detailed structure of the main frame 1 will be described. As described above, the main frame 1 includes the front frame 11 and the rear frame 12 extending in the front-rear direction at different angles in the side view, and the connecting member 13 provided between the frames 11 and 12. Specifically, the front frame 11 is a metal hollow frame extending along an inclined center line A1 (FIG. 1) extending rearward and downward from the head tube 6. The rear frame 12 is a metal pipe frame in which a plurality of pipe members extending in the front-rear direction at an angle closer to a horizontal direction than the center line A1 of the front frame 11 are combined. As shown in FIG. 6 in particular, the connecting member 13 is a metal square pipe member extending in the left-right direction, and is joined to both of the front frame 11 and the rear frame 12 (specifically, the lower pipes 122 described later) so as to connect a rear end lower portion of the front frame 11 and a front end portion of the rear frame 12 to each other. The connecting member 13 is disposed immediately behind a lower end portion of the seat tube 8 (see FIGS. 3 and 4).

Figure 7:
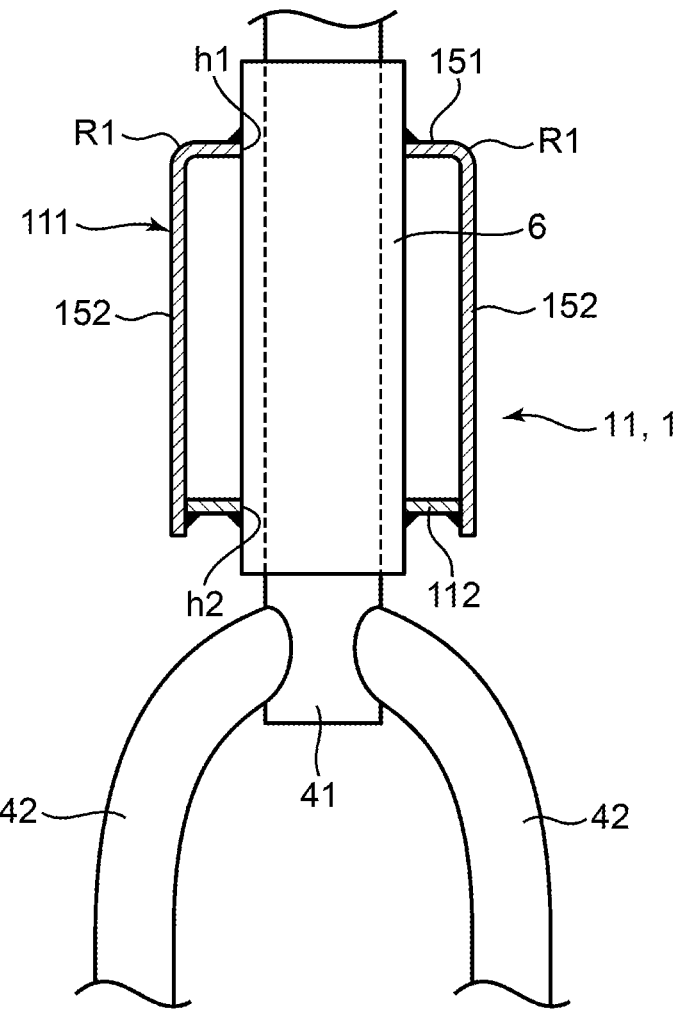
FIG. 7 is a cross-sectional view of a front end portion of a front frame of the main frame.
Figure 8:
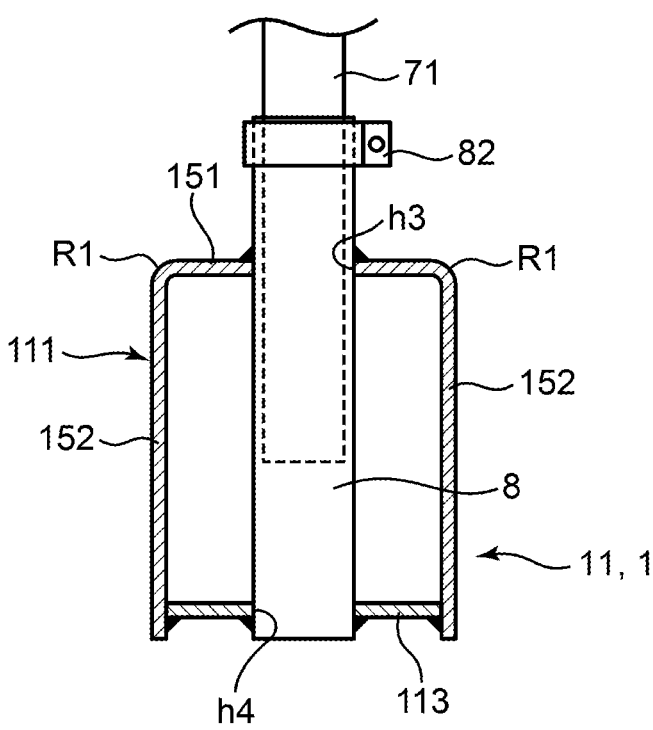
FIG. 8 is a cross-sectional view of a rear end portion of the front frame.

FIG. 7 is a cross-sectional view of the front end portion of the front frame 11 taken along an axis of the head tube 6. FIG. 8 is a cross-sectional view of the rear end portion of the front frame 11 taken along an axis of the seat tube 8. As shown in FIGS. 7 and 8 and FIGS. 1 to 6, the front frame 11 is a frame elongated in the front-rear direction and extending linearly along the center line A1. The front frame 11 has a substantially rectangular cross section orthogonal to the center line A1. A cross-sectional shape of the front frame 11 is formed such that a dimension in the up-down direction is larger than the dimension in the vehicle width direction. The front frame 11 includes a frame body 111, a front lower wall 112, a rear lower wall 113, and a rear wall 114.

The frame body 111 is a metal frame having an inverted U-shape in a cross-sectional view. That is, the frame body 111 integrally includes an upper wall 151 and a pair of left and right side walls 152. The pair of side walls 152 are plate-shaped bodies that face each other at a constant interval in the left-right direction. The upper wall 151 is a plate-shaped body that connects upper edges of the pair of side walls 152 to each other. A ridge line R1 is formed at a boundary between the upper wall 151 and each side wall 152. In other words, the front frame 11 is a hollow frame having a pair of right and left ridge lines R1 extending in the front-rear direction.

As shown in FIG. 7, the front lower wall 112 is a metal plate member joined to the frame body 111 so as to close a lower surface opening of the front end portion of the frame body 111. Specifically, the front lower wall 112 is disposed so as to cover only a region corresponding to the front end portion of the frame body 111 in an opening between the pair of side walls 152 of the frame body 111, and is joined to a lower end portion of each of the side walls 152 by welding.

As shown in FIG. 8, the rear lower wall 113 is a metal plate member joined to the frame body 111 so as to close the lower surface opening of the rear end portion of the frame body 111. Specifically, the rear lower wall 113 is disposed so as to cover only a region corresponding to the rear end portion of the frame body 111 in the opening between the pair of side walls 152 of the frame body 111, and is joined to the lower end portion of each side wall 152 by welding.

As shown in FIG. 6, the rear wall 114 is a metal plate member joined to the frame body 111 so as to close the opening at the rear end of the frame body 111. The rear wall 114 is joined to rear end portions of the upper wall 151 and the pair of side walls 152 of the frame body 111 by welding. As shown in FIGS. 2 and 3, holes for introducing the cables C1 and C2 into the frame body 111 are formed in the rear wall 114.

As shown in FIG. 7, the front frame 11 has through holes h1 and h2 for passing the head tube 6 at positions corresponding to the head tube 6, that is, at the front end portion. The through hole h1 is a hole penetrating the front end portion of the upper wall 151 of the frame body 111, and the through hole h2 is a hole penetrating the front lower wall 112. The head tube 6 is inserted into each of the through holes h1 and h2 of the upper wall 151 and the front lower wall 112, and is joined to a peripheral edge portion of each of the through holes h1 and h2 by welding. In other words, the head tube 6 is joined to the front end portion of the front frame 11 in a state of penetrating both the upper wall 151 and the front lower wall 112. The through holes h1 and h2 correspond to "front through holes" in the present disclosure.

As shown in FIG. 8, the front frame 11 has through holes h3 and h4 for allowing the seat tube 8 to pass therethrough at positions corresponding to the seat tube 8, that is, at the rear end portion. The through hole h3 is a hole penetrating the rear end portion of the upper wall 151 of the frame body 111, and the through hole h4 is a hole penetrating the rear lower wall 113. The seat tube 8 is inserted into each of the through holes h3 and h4 of the upper wall 151 and the rear lower wall 113, and is joined to a peripheral edge portion of each of the through holes h3 and h4 by welding. In other words, the seat tube 8 is joined to the rear end portion of the front frame 11 in a state of penetrating both the upper wall 151 and the rear lower wall 113. The through holes h3 and h4 correspond to "rear through holes" in the present disclosure.

A front cover 115 and a lower cover 116 (FIG. 4) are attached to the front frame 11. The front cover 115 is a resin cover attached to the front frame 11 so as to close a front end opening of the front frame 11. The lower cover 116 is a resin cover attached to the front frame 11 so as to close the lower surface opening of the front frame 11. Specifically, the lower cover 116 is attached to the front frame 11 so as to cover a remaining region of the lower surface opening of the front frame 11 where the front lower wall 112 and the rear lower wall 113 do not exist, that is, most of the lower surface opening including a central portion in the front-rear direction. The front cover 115 and the lower cover 116 are detachably attached to the front frame 11 via screws or the like. The opening formed in the lower surface of the front frame 11 in a state where the lower cover 116 is removed functions as an opening for taking in and out the battery 101.

The rear frame 12 includes a pair of left and right upper pipes 121, the pair of left and right lower pipes 122, and the pair of left and right end plates 123. The pair of end plates 123 are fixing portions to which both end portions of the axle 31 of the rear wheel 3 are fixed via the fastening member or the like. In other words, the rear wheel 3 is detachably attached to the rear frame 12 by fastening the axle 31 to the end plates 123. The pair of upper pipes 121 are pipe members extending forward from upper portions of the end plates 123. The pair of lower pipes 122 are pipe members extending forward from lower portions of the end plates 123. The lower pipe 122 corresponds to an "extension member" in the present disclosure.

A front end portion of each upper pipe 121 is joined to the rear end portion of the frame body 111 of the front frame 11 by welding. Specifically, the front end portions of the upper pipes 121 are joined by butt welding to positions corresponding to the left and right ridge lines R1 in the rear end portion of the frame body 111. Further, the front end portions of the upper pipes 121 extend slightly forward of the seat tube 8 through both left and right sides of the seat tube 8. In other words, the front end portions of the upper pipes 121 are joined to the frame body 111 (the front frame 11) in the vicinity of the left and right sides of the seat tube 8. A gusset plate 125 is attached between the front end portion of each upper pipe 121 and the upper wall 151 of the frame body 111. Each upper pipe 121 is welded to the frame body 111 together with the gusset plate 125.

The pair of upper pipes 121 are disposed at an interval larger than the dimension of the front portion of the rear wheel 3 in the vehicle width direction. In addition, in the present embodiment, since the in-wheel motor 10 is attached to the rear wheel 3, the rear end portions of the pair of upper pipes 121 are disposed at an interval larger than the dimension of the in-wheel motor 10 in the vehicle width direction.

Similarly, the pair of lower pipes 122 are disposed at an interval larger than the dimension of the front portion of the rear wheel 3 in the vehicle width direction. Further, the rear end portions of the pair of lower pipes 122 are disposed at an interval larger than the dimension of the in-wheel motor 10 in the vehicle width direction.

The front end portion of each lower pipe 122 is joined to the rear end portion of the front frame 11 via the connecting member 13. Specifically, as shown in FIG. 6, the connecting member 13 is joined to the rear end lower portion of the front frame 11, and the front end portions of the lower pipes 122 are joined to the connecting member 13, whereby the lower pipes 122 and the front frame 11 are joined to each other.

The upper pipe 121 and the lower pipe 122 are disposed so as to extend in the front-rear direction along center lines A2 and A3 shown in FIG. 1, respectively, in the side view. Each of the center lines A2 and A3 of the upper pipe 121 and the lower pipe 122 is closer to the horizontal direction than the inclined center line A1 of the front frame 11. Specifically, the center line A2 of the upper pipe 121 extends substantially parallel to a horizontal plane. The center line A3 of the lower pipe 122 is slightly inclined with respect to the horizontal plane, whereas an inclination angle thereof is smaller than the center line A1 of the front frame 11. In other words, the upper pipe 121 and the lower pipe 122 are disposed so as to extend in the front-rear direction at an angle closer to the horizontal direction than the front frame 11.

As described above, the center line A2 of the upper pipe 121 is non-parallel to the center line A3 of the substantially horizontal lower pipe 122, and is slightly inclined rearward and downward. That is, the upper pipe 121 and the lower pipe 122 are disposed such that the interval in the up-down direction increases toward the front side.

The end plate 123 is a plate member extending forward and downward from the axle 31 of the rear wheel 3. Rear end portions of the upper pipe 121 and the lower pipe 122 are joined to an upper portion and a lower portion of the end plate 123. That is, the rear end portion of the upper pipe 121 is joined to the upper portion of the end plate 123 at substantially the same height as the axle 31. The rear end portion of the lower pipe 122 is joined to the lower portion of the end plate 123 at a height lower than the axle 31. In this way, the upper pipe 121 and the lower pipe 122 are joined to different height positions of the end plate 123 in a state in which the upper pipe 121 and the lower pipe 122 are not parallel to each other.

The connecting member 13 is joined to the rear end lower portion of the front frame 11 in a posture in which four corners of a square pipe face up and down and front and rear. As shown in FIG. 6, a recess W for receiving a front corner 132 of the connecting member 13 is formed in the rear end lower portion of the front frame 11. In order to form the recess W, the pair of side walls 152 of the front frame 11 (frame body 111) have cutout portions 152a formed by cutting out the rear end lower portion of the front frame in a V shape. The rear lower wall 113 and the rear wall 114 are respectively joined to the rear end portion of the frame body 111 excluding the cutout portion 152a, so that the recess W opened rearward is formed in the front frame 11. The connecting member 13 is welded to the front frame 11 in a state in which the front corner 132 is inserted into the recess W. Specifically, the connecting member 13 inserted into the recess W is in contact with the cutout portion 152a of each side wall 152, an upper edge of the rear lower wall 113, and a lower edge of the rear wall 114. Then, welding is performed on each of contact portions, so that the connecting member 13 is joined to the rear end lower portion of the front frame 11.

A pair of left and right receiving holes h10 is formed in the connecting member 13. The receiving hole h10 is a hole that penetrates two left and right portions of a corner 133 on the rear side of the connecting member 13 and is opened rearward. The front end portions of the pair of lower pipes 122 of the rear frame 12 are inserted into the receiving holes h10. In the inserted state, the front end portions of the lower pipes 122 are welded to the peripheral edge portions of the receiving holes h10, whereby the connecting member 13 and the lower pipes 122 are joined to each other.

The connecting member 13 has support portions 131 that support the pair of steps 9 at both left and right end portions thereof. Each support portion 131 is a portion that receives each base portion 91 of the pair of steps 9, and has an opening Q that opens outward in the vehicle width direction. Each step 9 is fixed to the connecting member 13 by inserting the base portion 91 into each support portion 131 through the opening Q. Specifically, in a state in which the base portion 91 is inserted into the support portion 131, a bolt 95 that fastens the base portion 91 and the support portion 131 is fastened, whereby the step 9 is fixed to the connecting member 13 via the bolt 95.

As described above, the connecting member 13 supports the pair of steps 9 at the support portions 131 on both the left and right sides thereof, and is interposed between the front frame 11 and the lower pipe 122 of the rear frame 12 to connect the front frame 11 and the rear frame 12 by welding. In other words, the connecting member 13 is a component having both a function of supporting the step 9 and a function of connecting the lower pipe 122 and the front frame 11.

[Operation and Effect]

As described above, the balance bike according to the present embodiment includes the main frame 1 including the inclined front frame 11 and the rear frame 12 closer to the horizontal direction than the inclined front frame 11. The seat tube 8 that supports the seat 7 so as to be slidable in the up-down direction is fixed to the bent portion 15 that is a portion where the front frame 11 and the rear frame 12 of the main frame 1 are connected to each other. According to such a configuration, a fixing position of the seat tube 8 can be lowered as compared with a case where the main frame 1 is a frame extending linearly at the same inclination angle. For example, a linear main frame different from the main frame 1 in the present embodiment, that is, a main frame extending from the head tube 6 toward the axle 31 of the rear wheel 3 at a constant inclination angle is assumed. In the case of such a linear main frame, the height of the intermediate portion of the main frame in the front-rear direction is inevitably higher than the height of the bent portion 15 of the main frame 1 in the present embodiment. In other words, in the present embodiment, the height of the bent portion 15 can be made relatively low by using the main frame 1 having the bent portion 15 protruding downward. Accordingly, since the height of the seat tube 8 fixed to the bent portion 15 is reduced, the lower limit height (the position indicated by the solid line in FIG. 5) of the seat 7 slidably supported by the seat tube 8 can be reduced to a low level. This means that the lower limit height of the seat 7 can be lowered even if outer diameters of the wheels (the front wheel 2 and the rear wheel 3) are large to some extent. Therefore, it is possible to implement a balance bike that allows users in a broad range having different physical sizes to one another (in other words, ages) to ride while having a common wheel diameter.

For example, in a balance bike in which the main frame is linear, since the seat cannot be lowered sufficiently, it is necessary to line up a plurality of types of products having different outer diameters of wheels according to the physical size or age of the user. On the other hand, in the present embodiment, since the lower limit height of the seat 7 is kept low, it is possible to enlarge the range of users who can ride the bike while sharing the wheel diameter. For example, in the balance bike according to the present embodiment, a relatively large wheel diameter (for example, 16 inches) considered to be suitable for children in a high age group (for example, 5 to 8 year-old children) can be applied to children in a low age group (for example, 3 to 5 year-old children). That is, even when the wheel diameter is relatively large, if the seat 7 is lowered to the lower limit height, it is possible to implement a seat height suitable for children in the low age group having a small leg length (a distance from the sole of the foot to the crotch). When the height of the seat 7 is raised to the upper limit height, it is possible to implement a seat height suitable for children in the high age group having a large leg length. As described above, in the present embodiment, it is possible to implement a balance bike in which the users in the broad range having different physical sizes to one another (in other words, ages) can ride while having the common wheel diameter. Therefore, it is not necessary to separately set the wheel diameter according to a physical size difference, and it is possible to reduce the number of types of products.

In particular, in the present embodiment, when the seat 7 slides to the lower limit height, the upper surface of the saddle 72 of the seat 7 is lower than the height L1 corresponding to the upper end of the rear wheel 3 (see FIG. 5). Therefore, even if the wheel diameter is relatively large, the seat 7 can be lowered to a sufficiently low level suitable for children in the low age group, and the range of users who can ride the bike can be further expanded.

Here, even if the main frame has a linear shape, the height of the seat 7 can be reduced to some extent by sufficiently bringing the fixing position of the seat tube 8 close to the rear wheel 3. However, the approach of the seat tube 8 to the rear wheel 3 increases the distance in the front-rear direction from the saddle 72 to the handle 5. This means that it is difficult for the child user having a small physical size to operate the handle 5 in a state of sitting on the saddle 72. In this way, when the main frame has the linear shape, it is difficult to achieve both the reduction of the lower limit height of the seat 7 and the operability of the handle 5.

On the other hand, in the present embodiment, since the main frame 1 having the downwardly protruding bent portion 15 is adopted, the lower limit height of the seat 7 can be kept low even if the seat tube 8 is not so close to the rear wheel 3. That is, in the present embodiment, since the seat tube 8 can be fixed at a position relatively forward away from the rear wheel 3, the distance in the front-rear direction from the saddle 72 to the handle 5 can be shortened, and good operability can be provided even for the children having the small physical size. In other words, in the present embodiment, both the reduction of the lower limit height of the seat 7 and the operability of the handle 5 can be achieved.

In addition, in the present embodiment, the seat tube 8 is inclined such that the upper end portion thereof is located rearward of the lower end portion thereof. Therefore, when the seat 7 slides upward, the saddle 72 moves rearward compared to before the seat 7 slides, and the distance in the front-rear direction from the saddle 72 to the handle 5 increases. This means that the good operability can be provided to the child user having the large physical size. That is, in the present embodiment, the distance from the saddle 72 to the handle 5 is increased by the upward sliding of the seat 7. Therefore, even if the children having the large physical size ride the bike, a posture when operating the handle is unlikely to become cramped. As described above, in the present embodiment, since the front-rear position of the saddle 72 is naturally adjusted in accordance with up-down sliding of the seat 7, it is possible to provide the good operability to the users in the broad range having different physical sizes to one another.

As described above, in the present embodiment in which the main frame 1 is bent, it is easy to secure the distance in the front-rear direction from the seat tube 8 to the rear wheel 3, and thus it is easy to secure the distance from the rear end of the saddle 72 to the rear wheel 3. Accordingly, in the present embodiment, it is possible to prevent interference between the saddle 72 and the rear wheel 3 while allowing the seat 7 to be lowered to a sufficiently low lower limit position (a position indicated by a solid line in FIG. 5). In particular, in the present embodiment, since the seat tube 8 is inclined such that the saddle 72 moves forward in accordance with the downward sliding of the seat 7, the interference between the saddle 72 and the rear wheel 3 as described above can be made more unlikely to occur. In the present embodiment, the head tube 6 and the seat tube 8 are attached to the front frame 11 in a penetrating state. According to such a configuration, rigidity of the front frame 11 can be increased, and deformation of the front frame 11 can be prevented.

More specifically, in the present embodiment, the head tube 6 and the front frame 11 are joined by welding in a state where the head tube 6 is inserted into the through holes h1 and h2 in the front end portion of the front frame 11, and the seat tube 8 and the front frame 11 are joined by welding in a state where the seat tube 8 is inserted into the through holes h3 and h4 in the rear end portion of the front frame 11. According to such a configuration, both the head tube 6 and the seat tube 8 can be fixed to the front frame 11 by a common method of inserting the head tube 6 and the seat tube 8 into the through holes of the front frame 11 and joining the head tube 6 and the seat tube 8 to each other, and joint strength of both tubes 6 and 8 can be increased while simplifying the structure.

Further, in the present embodiment, since the seat tube 8 is supported not by the rear frame 12 but by the front frame 11, it is not necessary to construct a structure for supporting the seat tube 8 in the rear frame 12, and it is possible to improve a degree of freedom in designing the rear frame 12. Further, since the head tube 6 and the seat tube 8 having the same shape are respectively supported by the front end portion and the rear end portion of the front frame 11, it is not necessary to change the cross-sectional shape of the front frame 11 from the front end to the rear end of the front frame 11. Accordingly, it is possible to support the head tube 6 and the seat tube 8 on the front frame 11 while preventing the shape of the front frame 11 from becoming complicated.

Further, in the present embodiment, the front frame 11 and the rear frame 12 are joined to each other via the connecting member 13. In particular, the rear frame 12 and the connecting member 13 are joined by welding in a state where the front end portion of the lower pipe 122 of the rear frame 12 is inserted into the receiving hole h10 of the connecting member 13. According to such a configuration, compared to a case where the front end portion of the lower pipe 122 is joined to a connecting member having no hole corresponding to the receiving hole h10 (for example, a case where the front end portion of the lower pipe is joined to a surface of the connecting member by adhesion or the like), the lower pipe 122 and the connecting member 13 can be firmly joined to each other, and the joint strength between the front frame 11 and the rear frame 12 via the connecting member 13 can be increased. Accordingly, the rigidity of the main frame 1 and body rigidity of the balance bike can be sufficiently ensured.

In particular, the balance bike according to the present embodiment is of an electric type, and components such as the relatively heavy battery 101 are disposed inside the front frame 11. On the other hand, according to the present embodiment in which the front frame 11 and the rear frame 12 are firmly joined to each other via the connecting member 13, it is possible to impart sufficient rigidity to the main frame 1 so as to compensate for an increase in weight caused by the addition of the battery 101.

In the present embodiment, the pair of steps 9 are supported by the support portions 131 at the left and right end portions of the connecting member 13. According to such a configuration, the connecting member 13 that connects the front frame 11 and the rear frame 12 can also be used as a support member that supports the step 9. Accordingly, it is possible to increase support rigidity of the step 9 while reducing the number of components.

In the present embodiment, the battery 101 is disposed between the head tube 6 and the seat tube 8 inside the front frame 11. According to such a configuration, it is possible to efficiently dispose the battery 101 inside the front frame 11 while preventing the interference between the battery 101 and other components.

In the present embodiment, the front end portion of the upper pipe 121 extends to the front of the seat tube 8 and is joined to the front frame 11. According to such a configuration, the front frame 11 in the vicinity of the seat tube 8 can be reinforced by the upper pipe 121, and the support rigidity of the seat tube 8 can be increased.

In the present embodiment, the upper pipes 121 are disposed on both left and right sides (outer sides in the vehicle width direction) of the seat tube 8. According to such a configuration, it is possible to prevent the seat tube 8 and the rear end portion of the front frame 11 supporting the seat tube 8 from colliding with an obstacle.

Further, in the present embodiment, the upper pipe 121 and the lower pipe 122 are disposed non-parallel to each other such that the up-down interval increases toward the front side. According to such a configuration, it is possible to increase the rigidity of the upper pipe 121 and the lower pipe 122 with respect to a compressive force and a tensile force.

In the present embodiment, the seat tube 8 extending in the up-down direction and the connecting member 13 extending in the left-right direction are joined to the rear end portion of the front frame 11. According to such a configuration, a reinforcing member including the seat tube 8 and the connecting member 13 and extending in the up-down and left-right directions can be constructed at the rear end portion of the front frame 11, and the deformation of the rear end portion of the front frame 11 (in other words, the bent portion 15 of the main frame 1) can be effectively prevented. Since the connecting member 13 is disposed rearward of the seat tube 8, the reinforcing member can be constructed while avoiding the interference between the connecting member 13 and the seat tube 8.

In the present embodiment, the rear end portion of the front frame 11 and the front end portion of the lower pipe 122 face each other in the front-rear direction with the connecting member 13 interposed therebetween. According to such a configuration, it is possible to efficiently transmit the compressive force and the tensile force input to the lower pipe 122 to the front frame 11 at the time of acceleration and deceleration of the balance bike.

(2) Second Embodiment

In the first embodiment described above, a function of folding and storing the step 9 is not provided, whereas it may be convenient to have a storage function in the step for a user who mainly wants to ride a balance bike by self-traveling. This is because the step does not become an obstacle when the ground is kicked by a foot for the self-traveling. Therefore, an example in which the step has the storage function will be described as a second embodiment. Here, differences from the first embodiment will be mainly described, and other structures are the same as those of the first embodiment.

Figure 9:
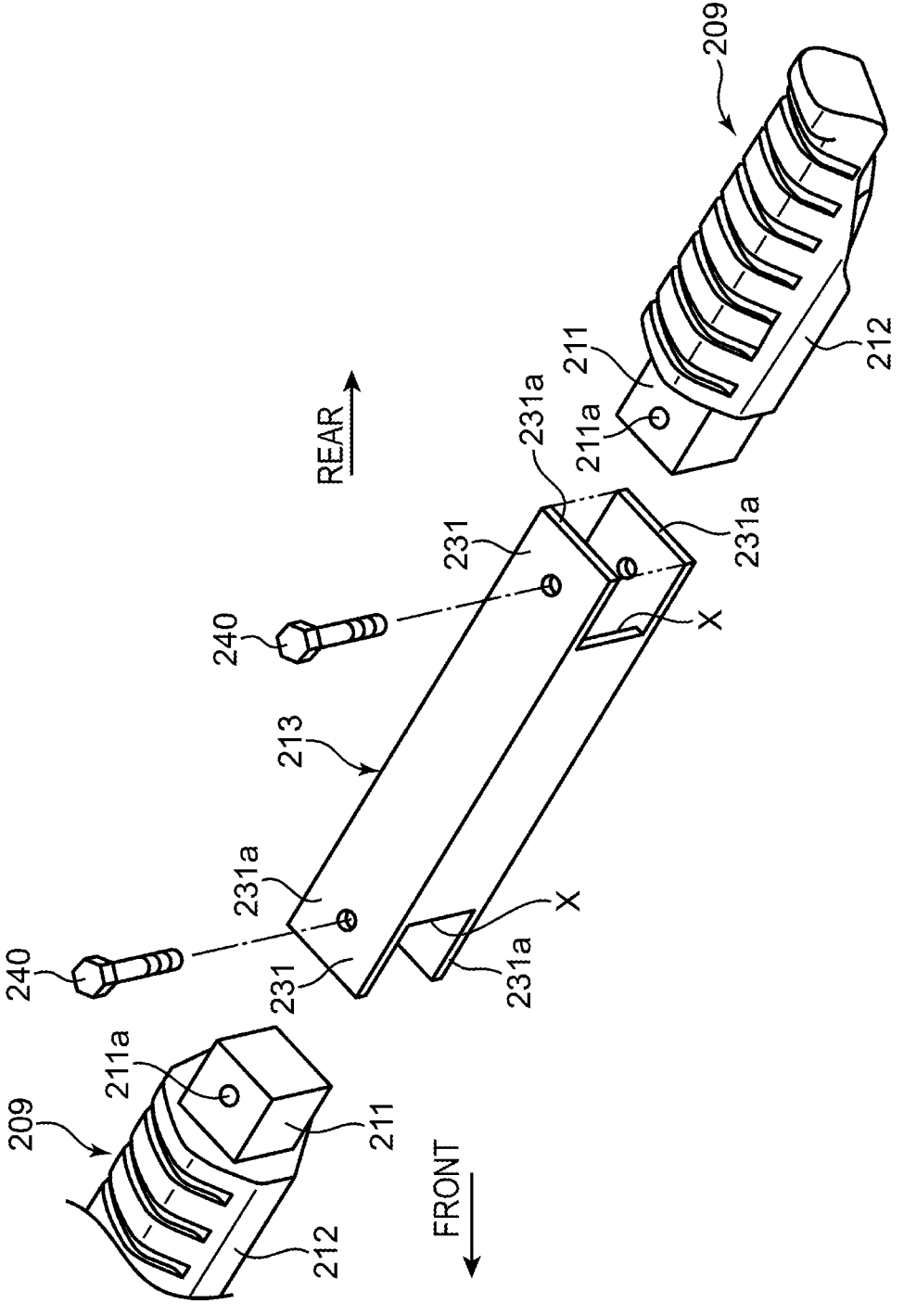
FIG. 9 is an exploded perspective view showing a peripheral structure of a step in a balance bike according to a second embodiment of the present disclosure.
Figure 10:
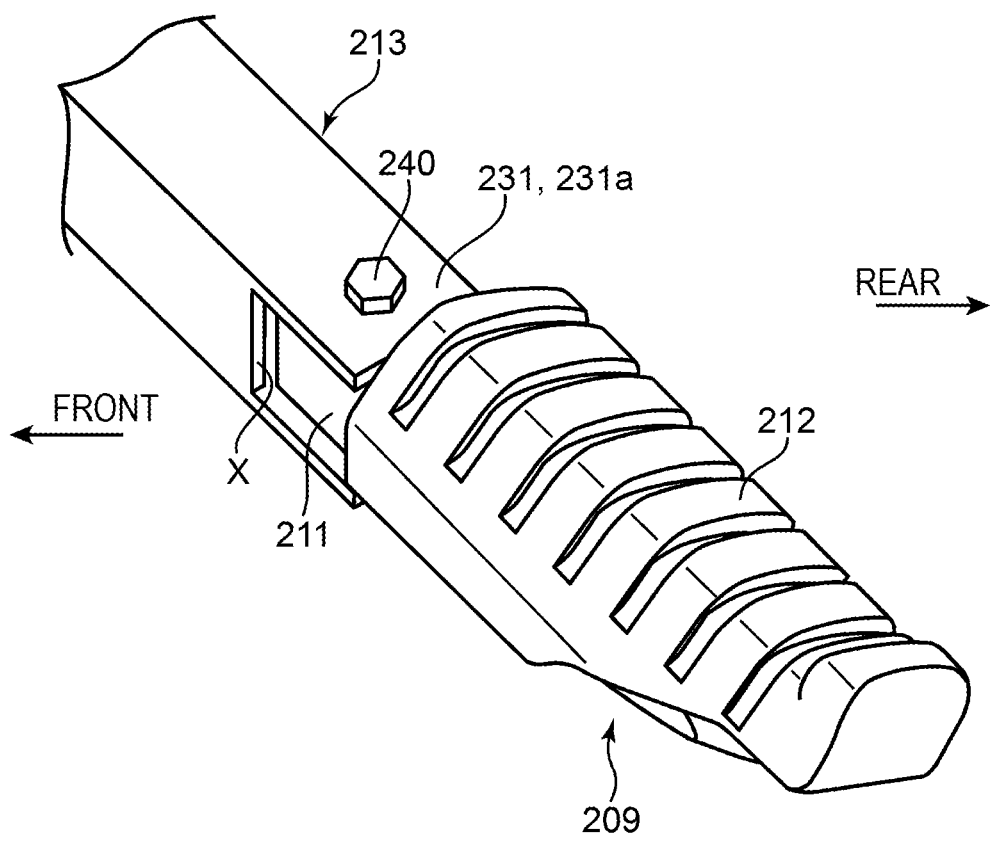
FIG. 10 is a perspective view showing the step in a protruded state.

FIG. 9 is an exploded perspective view showing a peripheral structure of a step 209 in a balance bike according to the second embodiment. FIG. 10 is a perspective view showing an attachment state of the step 209. As shown in FIGS. 9 to 10, the step 209 includes a base portion 211 and a step body 212. The base portion 211 is fixed to an end portion of a connecting member 213 in a vehicle width direction (left-right direction) in an inserted state. The step body 212 is a component on which a foot of an occupant is placed, and is provided so as to protrude outward in the vehicle width direction from the base portion 211 inserted into the end portion of the connecting member 213.

The connecting member 213 is a member that connects the front frame 11 and the lower pipe 122 of the rear frame 12, similarly to the connecting member 13 (see FIGS. 2 to 4 and FIG. 6) in the first embodiment described above. The connecting member 213 has a shape based on a square pipe extending in the vehicle width direction (left-right direction), and has support portions 231 for supporting the base portions 211 of the steps 209 at both left and right end portions. Each of the support portions 231 includes a pair of facing walls 231*a* formed by extending two walls of the connecting member 213 facing each other outward in the vehicle width direction. In other words, the connecting member 213 has, at both left and right end portions thereof, cutout portions X formed by cutting out a wall between the pair of facing walls 231*a*.

A bolt 240 is fixed to the support portion 231 between the pair of facing walls 231*a*. The base portion 211 of the step 209 is supported by the support portion 231 via the bolt 240. Specifically, a through hole 211*a* through which the bolt 240 is inserted is formed in the base portion 211. The step 209 is supported by the support portion 231 in a state where the step 209 is rotatable about a shaft portion of the bolt 240 inserted through the through hole 211*a*. Accordingly, the step 209 can be displaced between a protruded state in which the step 209 is disposed coaxially with the connecting member 213 so as to protrude outward in the vehicle width direction from the connecting member 213 and a stored state in which the step 209 is bent with respect to the connecting member 213.

Figure 11:
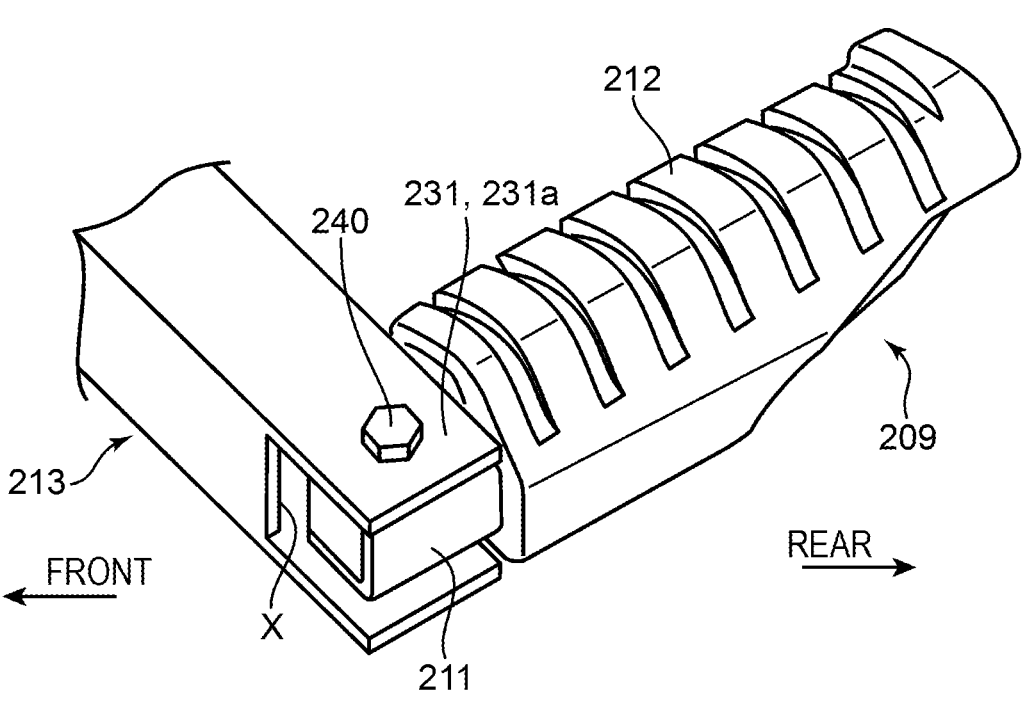
FIG. 11 is a perspective view showing the step in a stored state.

FIG. 11 is a perspective view showing the step 209 in the stored state. As shown in FIG. 11, the step 209 shifts from the protruded state shown in FIG. 10 to the stored state shown in FIG. 11 by rotating rearward (specifically, rearward and upward) about the shaft portion of the bolt 240. At this time, the base portion 211 of the step 209 can be rotated rearward without any trouble through the cutout portion X on a rear side of the connecting member 213. That is, since the cutout portions X are formed between the pair of facing walls 231*a* of the support portions 231, the base portion 211 rotating rearward is prevented from interfering with the end portion of the connecting member 213.

In the stored state shown in FIG. 11, the step 209 is disposed such that an axial center of the step 209 is oriented in a direction orthogonal to the vehicle width direction. In other words, when the step 209 is shifted to the stored state, a state in which the step 209 is bent rearward with respect to the connecting member 213 is obtained. Accordingly, since an amount of protrusion of the step 209 in the vehicle width direction with respect to the connecting member 213 is reduced, it is possible to prevent the step 209 from interfering with legs of the occupant who causes the balance bike to self-travel. For example, when the balance bike is caused to self-travel, the occupant, sitting on the saddle 72, kicks the ground near step 209 rearward with his/her foot, thereby causing the balance bike to travel forward. At this time, if the step 209 is in the stored state, the step 209 is less likely to interfere with the legs of the occupant. That is, in the second embodiment, since the step 209 can be displaced between the protruded state and the stored state, it is possible to improve traveling performance of the balance bike during the self-traveling.

(3) Modification

In each of the above embodiments, although the main frame 1 is constructed by joining the front frame 11 and the rear frame 12 by welding, the main frame 1 may be constructed by joining the front frame 11 and the rear frame 12 by a fastening member such as a bolt.

In each of the above embodiments, although the front end portion of the lower pipe 122 of the rear frame 12 is joined to the rear end portion of the front frame 11 via the connecting member 13, the front end portion of the lower pipe 122 may be directly joined to the rear end portion of the front frame 11. In other words, the connecting member 13 is not essential, and may be omitted.

In each of the above embodiments, although the main frame 1 is constructed by joining the separate front frame 11 and the rear frame 12, the main frame 1 may integrally include the front frame and the rear frame. That is, the main frame may be a frame having a downward protruding bent portion in the middle in the front-rear direction, and may be formed of a single frame component or a joined body obtained by joining a plurality of frame components.

In each of the above embodiments, in order to attach the steps 9 (209) to both ends of the connecting member 13 (213) formed of a square pipe member, the base portions 91 (211) of the steps 9 (209) are inserted into the openings at both ends of the connecting member 13 (213). That is, the steps may be attached to the connecting member by providing the protruding portions at both ends of the connecting member, providing the recesses at the end portions of the steps, and inserting the protruding portions of the connecting member into the recesses of the steps.

In each of the above embodiments, the step 9 (209) is supported by the support portion 131 (231) at each of the left and right end portions of the connecting member 13 (213), whereas the step 9 (209) may be attached to each of the left and right sides of the main frame 1, and the step 9 (209) is not necessarily attached to the connecting member 13 (213). For example, a support portion capable of supporting the step may be provided on each of left and right side surfaces of the main frame, and the step may be supported by each support portion.

In the second embodiment, the base portion 211 of the step 209 is rotatably supported by the support portion 231 of the connecting member 213 so that the step 209 can be displaced between the protruded state in which the step 209 protrudes outward in the vehicle width direction and the stored state in which the step 209 is bent rearward, whereas a method of storing the step 209 is not limited thereto. For example, a step that can extend and contract in the vehicle width direction may be attached to the main frame. In this case, the step advances outward in the vehicle width direction to be in the protruded state, and retreats inward in the vehicle width direction to be in the stored state.

In each of the above embodiments, as a drive source for electric traveling, only the motor 10 that drives the rear wheel 3 is provided, whereas the drive source may be any one that drives at least one of the front wheel and the rear wheel. That is, the drive source may be a motor that drives only the front wheel, or may be a motor that drives both the front wheel and the rear wheel.

In each of the above embodiments, the motor 10 including the in-wheel motor that is coaxially attached to the wheel is provided as the drive source for the electric traveling, whereas the drive source may not be the in-wheel motor. For example, a motor interlockingly connected to an axle via a gear or the like may be attached non-coaxially with the wheel.

In each of the above embodiments, the electric balance bike capable of electric traveling by the motor 10 is exemplified as the balance bike, whereas the balance bike is not limited to the electric balance bike. That is, the balance bike may be a balance bike that does not include a motor, a battery, or the like, that is, a balance bike that can only self-travel by a kick.

In each of the above embodiments, the balance bike including the pair of steps 9 (209) capable of being stored (capable of being displaced between the protruded state and the stored state) is exemplified, whereas the steps may not be storable. Further, the steps are not essential, and may be omitted.

On the other hand, when the step capable of being stored in the balance bike is provided, the main frame of the balance bike may not be a bent frame as shown in each of the above embodiments, and may be a linear frame in the related art.

(4) Summary

The above embodiments and modification thereof are summarized as follows.

A balance bike includes a front wheel and a rear wheel, a head portion that steerably holds the front wheel, a main frame that includes a front frame that extends rearward from the head portion while being inclined downward and a rear frame that extends rearward from a rear end of the front frame at an angle closer to a horizontal direction than the front frame, and that connects the head portion and the rear wheel, and a seat support portion that is fixed to a bent portion that is a portion where the front frame and the rear frame are connected to each other, and that supports a seat so as to be slidable in an up-down direction.

In the present aspect, since the seat support portion that slidably supports the seat is fixed to the bent portion that is the portion where the front frame and the rear frame of the main frame are connected to each other, a fixing position of the seat support portion can be lowered as compared with a case where the main frame is a frame that extends linearly at the same inclination angle. Accordingly, it is possible to reduce a lower limit height of the seat while increasing an outer diameter of the wheels (the front wheel and the rear wheel), and it is possible to implement a balance bike in which users in a broad range having different physical sizes to one another can ride.

For example, when the seat is lowered to the lower limit height, children in a low age group having a small leg length (distance from a sole of a foot to a crotch) can easily ride the balance bike. If the seat is raised to an upper limit height, children in a high age group having a large leg length can easily ride the balance bike. In this way, since a seat height can be appropriately adjusted in accordance with the physical size (age) of the user, a range of the user can be sufficiently enlarged.

In the present aspect in which the bent main frame is adopted, unlike a case in which the main frame is linear, even if the seat support portion is away forward from the rear wheel to some extent, the height of the seat support portion can be kept low. That is, in the present aspect, the fixing position of the seat support portion can be set to a position as low as possible and away forward from the rear wheel. The fact that the seat support portion is away forward from the rear wheel means that a distance from the seat to a handle becomes short. Accordingly, it is easy to operate the handle in a state in which the user sits on the seat, so that operability of the balance bike can be improved.

Preferably, the head portion is joined to the front frame in a state of being inserted into a front through hole formed in a front portion of the front frame, and the seat support portion is joined to the front frame in a state of being inserted into a rear through hole formed in a rear portion of the front frame.

In the present aspect, both the head portion and the seat support portion can be fixed to the front frame by a common method of inserting and joining the head portion and the seat support portion into the through hole of the front frame, and joint strength of the head portion and the seat support portion can be increased while simplifying a structure.

Preferably, the seat support portion allows the seat to slide to a level lower than an upper end of the rear wheel.

In the present aspect, even if a wheel diameter is relatively large, the seat can be lowered to a sufficiently low level suitable for the children in the low age group, and the age group of the user can be further expanded.

Preferably, the rear frame includes an extension member that is separate from the front frame and extends in a front-rear direction. The main frame includes a connecting member to which the rear end of the front frame and a front end of the extension member are joined. The connecting member and the extension member are joined to each other in a state where a front end portion of the extension member is inserted into a hole provided in the connecting member.

In the present aspect, since the extension member of the rear frame and the connecting member are firmly joined to each other, the joint strength between the front frame and the rear frame via the connecting member can be increased, and rigidity of the main frame and body rigidity of the balance bike can be sufficiently secured.

Preferably, the balance bike further includes a pair of left and right steps on which feet of an occupant are placed. The connecting member has a pair of support portions at both left and right end portions thereof for supporting the steps.

In the present aspect, the connecting member that connects the front frame and the rear frame can also be used as a support member that supports the steps. Accordingly, it is possible to increase the support rigidity of the steps while reducing the number of components.

Preferably, the step is displaceable between a protruded state in which the step protrudes outward in the vehicle width direction from the connecting member and a stored state in which an amount of protrusion in the vehicle width direction is smaller than that in the protruded state. Specifically, the stored state may be a state in which the step is bent with respect to the protruded state.

In the present aspect, it is possible to improve traveling performance when the balance bike is caused to self-travel by the occupant. That is, when the balance bike is caused to self-travel, the occupant, sitting on the seat, kicks the ground near the step rearward with his/her foot, thereby causing the balance bike to travel forward. When the step is displaced from the protruded state to the stored state during the self-traveling, it is possible to prevent the steps from inter-fering with legs of the occupant. In other words, it is not necessary for the occupant to widely spread both legs in order to avoid the interference with the steps, and the occupant can kick the ground near a vehicle width center with his/her foot. In this way, since the occupant can kick the ground in a natural posture, the balance bike can be made to self-travel smoothly.

Further, the step being displaceable between the protruded state and the stored state leads to an increase in the range of the users who can ride the bike.

For example, when a user having a small physical size and a small leg length (a short leg) rides the balance bike, the user tends to kick the ground near the vehicle width center with his/her foot in a state in which the legs are linearly extended from the seat (saddle). In such a case, if the step is in the stored state, the step is less likely to interfere with the leg, so that a motion of kicking the ground is easily performed, and the traveling performance of the balance bike by the kick is improved.

On the other hand, when a user having a large physical size and a large leg length (a long leg) rides the balance bike, the user tends to kick the ground away from the vehicle width center with his/her foot while slightly opening the leg. Therefore, even when the step is in the protruded state, the step is unlikely to interfere with the leg. Rather, when the step is in the protruded state, the foot can be placed on the step during traveling, and thus fatigue during traveling can be reduced.

In this way, in the present aspect in which the steps can be stored, it is possible to provide convenience to each user having a different physical size. Accordingly, it is possible to expand the range of users who can ride the bike.

What is claimed is:

1. A balance bike comprising:
a front wheel and a rear wheel;
a head portion steerably holding the front wheel;
a main frame including a front frame extending rearward from the head portion while being inclined downward and a rear frame extending rearward from a rear end of the front frame at an angle closer to a horizontal direction than a direction in which the front frame extends, the main frame connecting the head portion and the rear wheel;
a seat support portion fixed to a bent portion where the front frame and the rear frame are connected to each other, and supporting a seat slidably in an up-down direction;
a motor configured to drive at least one of the front wheel and the rear wheel; and
a battery configured to supply electric power to the motor, wherein
the battery is disposed between the head portion and the seat support portion inside the front frame,
the rear frame includes an upper pipe and a lower pipe which are disposed to be away from each other in an up-down direction,
a portion where the front frame and the upper pipe are connected to each other is bent to protrude down-ward,
a portion where the front frame and the lower pipe are connected to each other is bent to protrude down-ward, the upper pipe and the lower pipe are disposed such that an interval in the up-down direction increases toward a front side of the balance bike, and
a crank and a pedal for transmitting a pedaling force by an occupant into at least one of the front wheel and the rear wheel are omitted from the balance bike.

2. The balance bike according to claim 1, wherein
the head portion is joined to the front frame in a state of being inserted into a front through hole formed in a front portion of the front frame, and
the seat support portion is joined to the front frame in a state of being inserted into a rear through hole formed in a rear portion of the front frame.

3. The balance bike according to claim 1, wherein
the seat support portion is designed such that the seat slides to a position lower than an upper end of the rear wheel.

4. The balance bike according to claim 3, wherein
a height of an upper end of the seat support portion is lower than the upper end of the rear wheel.

5. The balance bike according to claim 1, wherein
the rear frame includes an extension member that is a separate member from the front frame and extends in a front-rear direction,
the main frame includes a connecting member to which the rear end of the front frame and a front end of the extension member are each joined, and
the connecting member and the extension member are joined to each other in a state where a front end portion of the extension member is inserted into a hole pro-vided in the connecting member.

6. The balance bike according to claim 1, further com-prising:
a pair of left and right steps on which feet of the occupant are placed, wherein
the main frame includes a pair of left and right support portions supporting the steps, and
the steps are displaceable between a protruded state in which the steps protrude outward in a vehicle width direction from the main frame and a stored state in which an amount of protrusion in the vehicle width direction is smaller than an amount of protrusion in the protruded state.

7. The balance bike according to claim 1, further com-prising:
a gusset plate is provided to join between the front end portion of each upper pipe and an upper wall of a frame body.

8. A balance bike comprising:
a front wheel and a rear wheel;
a head portion steerably holding the front wheel;
a main frame including a front frame extending rearward from the head portion while being inclined downward and a rear frame extending rearward from a rear end of the front frame at an angle closer to a horizontal direction than a direction in which the front frame extends, the main frame connecting the head portion and the rear wheel;
a seat support portion fixed to a bent portion where the front frame and the rear frame are connected to each other, and supporting a seat slidably in an up-down direction;
a motor configured to drive at least one of the front wheel and the rear wheel; and
a battery configured to supply electric power to the motor, wherein the battery is disposed between the head portion and the seat support portion inside the front frame, the rear frame includes an upper pipe and a lower pipe which are disposed to be away from each other in an up-down direction, a portion where the front frame and the upper pipe are connected to each other is bent to protrude downward, a portion where the front frame and the lower pipe are connected to each other is bent to protrude downward, the upper pipe and the lower pipe are disposed such that an interval in the up-down direction increases toward a front side of the balance bike, the rear frame includes an extension member that is a separate member from the front frame and extends in a front-rear direction, the main frame includes a connecting member to which the rear end of the front frame and a front end of the extension member are each joined, the connecting member and the extension member are joined to each other in a state where a front end portion of the extension member is inserted into a hole provided in the connecting member, the balance bike further comprises a pair of left and right steps on which feet of an occupant are placed, and the connecting member includes a pair of support portions at both left and right end portions of the connecting member, the support portions supporting the steps.

9. The balance bike according to claim 8, wherein the steps are supported by the support portions displaceably between a protruded state in which the steps protrude outward in a vehicle width direction from the connecting member and a stored state in which the steps bend with respect to the protruded state.

10. The balance bike according to claim 8, wherein the lower pipe includes a pair of left and right lower pipes, and the front end portions of the pair of left and right lower pipes are joined to the connecting member.

\* \* \* \* \*